Figure 1:
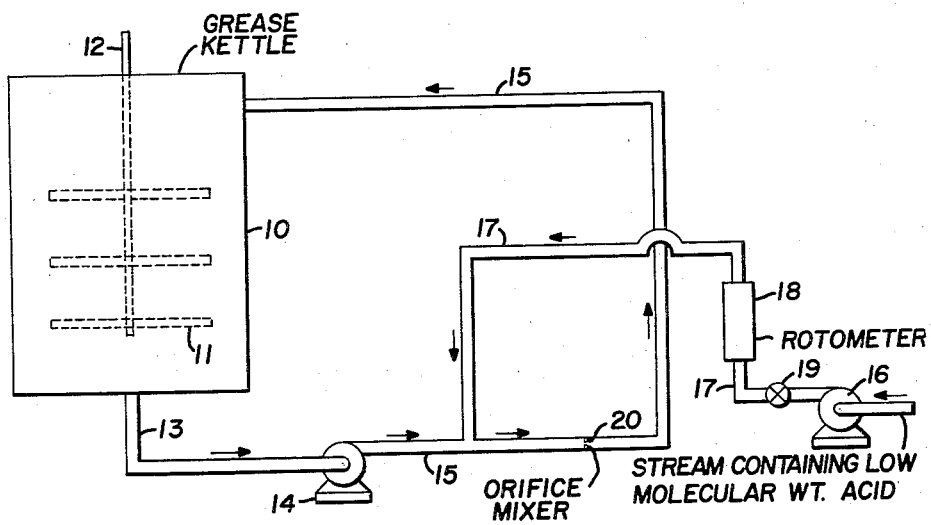

Sept. 2, 1958  R. A. THOMPSON, JR., ET AL  2,850,457
PROCESS FOR PREPARING MIXED-SALT GREASE COMPOSITIONS
Filed May 1, 1956

Russell A. Thompson, Jr.
John F. Richards  Inventors

By  *E. J. Brenner*  Attorney

United States Patent Office 2,850,457
Patented Sept. 2, 1958

2,850,457
PROCESS FOR PREPARING MIXED-SALT GREASE COMPOSITIONS

Russell Albert Thompson, Jr., and John Francis Richards, Baton Rouge, La., assignors to Esso Research and Engineering Company, a corporation of Delaware Application May 1, 1956, Serial No. 581,932

11 Claims. (Cl. 252—39)

This invention relates to an improved method for preparing lubricating grease compositions thickened with a complex mixed-salt thickener and the compositions produced thereby. In particular, the invention relates to an improved process for preparing lubricating greases thickened with complex mixed-salt thickeners whereby a smooth, homogeneous and substantially grain-free (or grit-free) product is produced.

A complex mixed-salt thickener of the invention is formed by the neutralization with a metal base of (1) a low molecular weight organic and/or inorganic acid and (2) a high and/or intermediate molecular weight fatty acid. The complex mixed-salt thickener will therefore be formed from one of the following combinations of acids:

(a) Low molecular weight acid and high molecular weight acid.

(b) Low molecular weight acid and an intermediate molecular weight acid.

(c) Low molecular weight acid, an intermediate weight acid and a high molecular weight acid.

In the preparation of these complex mixed-salt thickeners, the most generally used method of the prior art involved coneutralization of all of these acids. In the coneutralization method, a mixture of the low and high and/or intermediate molecular weight acids is neutralized with suitable bases, particularly the hydroxide and/or carbonate of the desired metals. This coneutralization step is generally carried out in a grease kettle "in situ," in the liquid menstruum to which the complex compound is to be applied in actual use. For example, the mixed acids may be coneutralized in a portion or all of the lubricating oil forming the dispersant of a grease to be thickened by the mixed-salt complex. Coneutralization is possible in cases in which the salts have the same metal constituent, and the menstruum is inert under the conditions of saponification or neutralization. The coneutralized material may be heated to temperatures of about 250° to 550° F. prior to use in order to dehydrate the product and to promote the formation of a complex in some instances, as when an alkaline earth metal hydrate is used.

The mixed-salt complex has also been prepared by separately preforming at least a portion of the high and/or intermediate molecular weight carboxylic acid salt, intimately mixing this salt with the low molecular weight salt, and then heating, if necessary. This method is less desirable than coneutralization and is useful from a practical standpoint only when different metals are employed in forming the different salts.

It has also been known that when mixed-salt complexes are formed in a liquid dispersant or solvent, they may be isolated by solvent extraction of the dispersing medium in a solvent in which they are insoluble. Suitable solvents include hydrocarbons, alcohols, ketones, etc.; the proper choice depending on the solubility characteristics of the liquid menstruum used to disperse the complex. However, this method is seldom used, as it is more desirable to form the complex thickener directly in the lubricating medium in which it is to be used, by the coneutralization method.

However, although the coneutralization method is the preferred method of forming complex mixed-salt thickeners of the same metal, it has the disadvantage of forming a "gritty" (or grainy) grease (i. e., a grease which contains small, hard particles) when certain low molecular weight acids are used in forming the complex thickener. For example, in the formation of greases thickened with a complex mixed-salt thickener wherein the low molecular weight acid used in forming the complex is acetic acid and the metal base is hydrated lime, the formation of grit is particularly bad and very undesirable. This grit apparently results from the reaction of the low molecular weight acid with the metal base to form a salt which does not complex, i. e., enter into further reaction with the high and/or the intermediate molecular weight acid. It appears that these grits form around droplets of the low molecular weight acid which reacts with the metal base before these droplets are finally dispersed by the slow mixing of the grease kettle. This gritty substance once formed cannot be dispersed or eliminated by cooking, and milling or homogenizing merely reduces the size of the particles without removing them. Filtration can be used to remove the gritty particles; however, this is not favored as it results in a loss of material and is not practical in plant operations due to rapid plugging of the filter.

It has now been found that the amount and size of this grit is related to the degree of dispersion or of agitation during the addition of the low molecular weight acid to the mixture containing the metal base. This invention is therefore directed towards an improved process of preparing these complex mixed-salt thickeners which eliminates or at least substantially reduces the formation of objectionable grit particles.

The high molecular weight carboxylic acids contemplated in this invention are the saturated and unsaturated grease-making fatty acids that are commonly known in the art. In general, these fatty acids have from about 12 to 30 carbon atoms, preferably about 12 to 22 carbon atoms per molecule, having saponification values of from about 300 to 150. Suitable fatty acids include lauric, myristic acid, palmitic acid, stearic acid, the various hydroxy stearic acids, oleic acid, arachidic acid, behinic acid and the like. Naturally occurring fatty acids such as fish oil acids, tallow acid, coconut oil acids, etc. may also be utilized directly or after hydrogenation to decrease any undesirably high degree of unsaturation. Mixtures of these high molecular weight fatty acids, e. g. hydrogenated fish oil acids with oleic acid, in any proportions, are also operable, as are fractions obtained by distillation, extraction or crystallation.

The intermediate molecular weight monocarboxylic acids are those straight-chain, saturated fatty acids having from about 7 to 10 carbon atoms. Operable intermediate molecular weight carboxylic acids are exemplified by:

| | Mol. weight | Sap. No. (mgs. KOH/gm.) |
|---|---|---|
| Enanthic (heptanoic) | 130 | 431 |
| Caprylic (octanoic) | 144 | 389 |
| Pelargonic (nonanoic) | 158 | 354 |
| Capric (decanoic) | 172 | 326 |

Caprylic and pelargonic acids are preferred. The intermediate molecular weight carboxylic acids of even carbon chain lengths are normally obtained by processing from naturally occurring materials such as coconut oils. Pelargonic acid is obtained as a by-product in the production of azelaic acid by the ozonolysis of oleic acid.

Suitable low molecular weight acids include saturated and unsaturated aliphatic monocarboxylic acids having about 1 to 6 carbon atoms, such as formic, acetic, propionic, furoic, acrylic and similar acids including their hydroxy derivatives, such as lactic acid, etc. Saturated monocarboxylic acids having 1 to 3 carbon atoms per molecule are preferred. Formic and particularly acetic acid are especially preferred. Also, inorganic acids such as hydrochloric, phosphoric, nitric and/or sulfuric acids may be substituted for all or part of the low molecular weight organic acids.

Acetic acid, which is especially preferred, may be employed as glacial acetic acid or in a concentrated aqueous solution.

The metal components of the mixed-salts may be any group II metal, such as the alkaline earth metals, e. g. calcium, magnesium, barium or strontium, and may be supplied in the form of a metal base such as either the metal oxides, hydroxides or metal carbonates. Calcium hydroxide or hydrated lime is especially preferred.

The lubricating oil may be either a mineral base lubricating oil or various synthetic oils. Mineral base lubricating oils ranging in viscosity from about 30–1000 S. S. U.'s at 100° F. are preferably employed as the liquid phase of the grease compositions of the invention. These naturally occurring mineral lubricating oils may be derived from any petroleum crude source, whether paraffinic or naphthenic in type, and may be refined by any of the known refining techniques of the petroleum industry.

The invention is not limited, however, to the use of mineral base oils, since various synthetic oils having at least 30 Saybolt Universal viscosity at 100° F. may also be used as part or all of the liquid phase of the grease. Examples of operable synthetic lubricating oils include ether alcohols, such as those corresponding to the general formula $$RO(C_nH_{2n}O)_xH$$

wherein R is an alkyl group, e. g. butyl, $n$ is an integer from 2 to 5 and $x$ is an integer from 1 to 40; esters of monobasic carboxylic acids, totalling 20 to 80 carbon atoms, such as those of $C_4$ to $C_{18}$ aliphatic acids with $C_4$ to $C_{18}$ aliphatic alcohols, the $C_4$ to $C_{18}$ radicals including the butyl, isobutyl, hexyl, octyl, iso-octyl, 2-ethyl hexyl, nonyl, decyl, lauryl, stearyl and similar radicals; diesters of dibasic acids, such as adipic or sebacic acid with monohydric alcohols, such as hexyl, octyl, 2-ethyl hexyl or higher alcohols; esters of polyethylene glycols with $C_8$ to $C_{18}$ branched-chain carboxylic acids; complex esters of polybasic carboxylic acids, polyhydric alcohols, and monobasic acids and/or monohydric alcohols, such as the glycol-centered or dibasic acid-centered complex esters; phosphoric acid esters or thioesters of aliphatic alcohols or mercaptans of up to about 18 carbon atoms; halocarbon oils, such as the polymers of chlorofluoro alkylenes like chlorotrifluoroethylene; organo-siloxanes; sulfite esters, organic carbonates; mercaptals; formals, etc.

In preparing the lubricating grease composition of this invention, about 50 to 97 wt. percent of lubricating oil and from about 3 to 50 wt. percent of the complex thickener may be used. A preferred range is from about 10 to 30 wt. percent of the complex thickener, based on the weight of the total composition. This complex thickener, in turn, is prepared by using 1 mole of the high and/or intermediate molecular weight acid with about 3 to 15 mols, preferably 5 to 12 mols of the low molecular weight acid and about 2 to 8 mols, preferably 3 to 6 mols of the metal base.

Mixtures of the high and intermediate molecular weight acids may also be used in any ratios, e. g. about .15 to 50.0 mols of high molecular weight acid per mole of intermediate molecular weight acid.

The composition prepared in accordance with the invention may also contain various conventional additives, such as inhibitors, dyes, metal deactivators, corrosion preventives, deodorants, etc., as will be understood by those skilled in the art.

The improved process of the invention is carried out by achieving very intimate mixing of a stream which contains the low molecular weight acid with a stream containing the metal base. This process can be carried out in various ways. The stream which contains the low molecular weight acid may also contain part or all of the lubricating oil and the high and/or intermediate weight acids, or the lubricating oil and high and/or intermediate molecular acids may be part of the stream containing the metal base. The metal base may also be contained in the oil in one stream, while the other stream contains the low molecular weight acid and the high and/or intermediate molecular weight acid.

The essential condition is that one stream contains the low molecular weight acid while the other stream contains the metal base. However, since the low molecular weight acid will generally be insoluble in oil, it is preferred that the oil is not present in the stream containing the low molecular weight acid.

The preferred method of the invention involves initially forming in a grease-making zone (e. g. a grease kettle) a slurry of the lubricating oil and the metal base; this slurry preferably also contains the high and/or intermediate molecular weight acids. This slurry is then pumped continuously from the grease kettle, through a circulating line and then returned to the grease kettle. The low molecular weight acid is slowly added to this continuous stream of circulating lime slurrry.

The invention will be more fully understood by reference to the following descriptions of specific grease preparations:

CONVENTIONAL CONEUTRALIZATION METHOD

A blend was prepared of the following ingredients:

| | Pounds |
|---|---|
| Mineral lubricating oil having a viscosity of 500 SSU at 100° F., refined by conventional means | 4,250 |
| Hydrated lime (98.5% $Ca(OH)_2$) | 530 |
| Castor wax (hydrogenated castor oil, mol. wt. of about 932 and 86/87° F. M. P.) | 175 |
| Hydrofol Acid 51 (mixture of hydrogenated fish oil acid containing 10% $C_{14}$, 25% $C_{16}$, 45% $C_{18}$, 10% $C_{20}$ and 5% $C_{22}$ saturated acids) | 175 |
| Glacial acetic acid (99%) | 695 |

The above ingredients were mixed and heated in a conventional fire heated grease kettle to a temperature of about 275° F., at which point 1,740 pounds of additional lubricating oil were added. The mixture was then heated to about 450° F., at which temperature the complex thickener is formed. The resulting grease was cooled to 250° F. and 44 pounds of phenyl-alpha-naphthylamine were added. The grease was further cooled to about 110° F. and then passed through a Manton Gaulin homogenizer operating under a 4000 p. s. i. pressure drop. After passing through the homogenizer, the grease was packaged and then allowed to cool to room temperature.

METHOD OF PRESENT INVENTION

Figure 2:
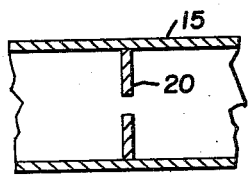

The present invention will be better understood by reference to the accompanying drawings of which Fig. 1 is a schematic drawing of apparatus adapted to carry out the method of the present invention; and Fig. 2 is a sectional view of the orifice mixer shown in Fig. 1.

Referring now to Fig. 1, a slurry is prepared containing the metal base and at least a portion of lubricating oil in the grease kettle 10 equipped with paddle blades 11 mounted on the shaft 12. The slurry is then continuously circulated from the kettle 10 at a temperature of about 50 to 200° F., through the line 13 to the intake of the pump 14, where it is discharged into the line 15, and is returned to the kettle 10. A stream containing the low molecular weight acid passes through the pump 16 into the line 17 and is preferably continuously injected into the line 15. An orifice mixer plate 20 (or equivalent mixing means) is provided in the line 15 for the purpose of aiding the dispersion of the low molecular weight acid into the slurry containing the metal base. The rate of addition of the low molecular weight acid is measured by the rotometer 18 provided on the line 17, and the addition rate is regulated by the valve 19.

The orifice mixer 20 is shown in greater detail in Fig. 2 and is simply one or more metal plates provided with a central orifice inserted in the line 15 for the purpose of obtaining a more intimate mixing of the two streams.

Assuming the amount of slurry formed in the grease kettle 10, to be 1 part by volume, the slurry is circulated through the circulating system at a rate of about 0.05 to 0.50 volume per minute and preferably at a rate of 0.1 to 0.2 volume per minute. The stream containing the low molecular weight acid is injected into the circulating slurry downstream of the circulating pump 14, at the rate of .001 to .05 volume per minute and is preferably injected at the rate of .002 to .008 volume per minute. However, the ratio of the rate of circulation of the slurry to the rate of addition of the low molecular weight acid should be about 10/1 to about 100/1 or higher, and preferably is between about 25/1 and 50/1. In order to achieve intimate mixing the orifice mixer 20 is preferably installed in the circulating line 15 at a point immediately downstream of line 17, although it may be up to about a foot downstream of the junction with line 17. The pressure drop across the orifice plate mixer will be about 5 to 30 p. s. i. g. and preferably will be 10 to 15 p. s. i. g.

After the correct amount of the low molecular weight acid is added to the slurry stream containing the metal base, the circulation of the recycle stream may be discontinued and the contents of the grease kettle are then further processed to form the complex thickeners of the finished grease product by heating to about 400°–550° F., preferably about 450°–500° F. for a time sufficient to form the complex.

*Example I*

A slurry was prepared of the following ingredients:

Mineral lubricating oil, viscosity
  of 500 SSU @ 100° F._____ 4,250 lbs. (570 gal.)
Hydrated lime (98.5% Ca(OH)$_2$)_ 530 lbs. ( 27 gal.)
Castor wax (hydrogenated castor
  oil) _____ 175 lbs. ( 23 gal.)
Hydrofol Acid 51 (hydrogenated
  fish oil acids)_____ 175 lbs. ( 23 gal.)

643 total gallons

Referring to the drawing, the above ingredients were mixed in the grease kettle 10 to form a slurry. The slurry was then circulated through line 13, the pump 14 and then through line 15 back to the kettle 10, at the rate of 50 gallons per minute. Glacial acetic acid was pumped by the pump 16 through the line 17 and injected into the line 15 at a point about 4″ upstream from the orifice mixer 20. The acetic acid was added at the rate of about 9 pounds per minute (1.1 gal. of acetic acid per minute), as measured by the rotometer 18. A total of 695 pounds of glacial acetic acid were added over a period of time of about 80 minutes. The average pressure drop across the orifice mixer was 10 p. s. i. After all the acetic acid had been added, the contents of the kettle were then heated to a temperature of 275° F., and 1,740 additional pounds (230 gals.) of the mineral lubricating oil were added. The mixture was then heated to a temperature of 450° F. over a period of time of about 8 hours. It was maintained at 450° F. for about 60 minutes, during which time, the formation of the complex thickener was completed. The grease was allowed to cool to a temperature of about 250° F. and 44 pounds of phenyl-alpha-naphthylamine were then added. The grease was further cooled to 110° F., and then passed through a Manton Gaulin homogenizer operating under a 4000 p. s. i. pressure drop. The grease was then packaged and air cooled to room temperature.

*Example II*

This example was carried out according to the method of Example I except that the acetic acid was added to a circulating slurry consisting only of lime and lubricating oil. After all the acetic acid was added, the high molecular weight acids were then added and the grease was finished.

The slurry was prepared by blending the following ingredients in the grease kettle of Example I.

Mineral lubricating oil_____ 4,250 pounds (570 gal.)
Hydrated lime_____ 530 pounds ( 27 gal.)

Total_____ 597 gal.

The above blend was circulated at the rate of 50 gal. per minute and 695 pounds (84 gal.) of glacial acetic acid were added to the circulating lime slurry at the rate of 9 pounds per minute according to the method of Example I. After all the acetic acid was added, 175 pounds of castor wax, 175 pounds of Hydrofol Acid 51 and 2,000 pounds of additional mineral oil were then added to the kettle. The kettle was heated to a temperature of 275° F. at which point 1,740 pounds of additional mineral lubricating oil were added to the kettle. The kettle was then heated to 450° F. to form the complex grease. The contents were then cooled to 250° F., 44 pounds of phenyl-alpha-naphthylamine were added, and the grease was homogenized and finished in the manner described in Example I.

The following table compares the physical characteristics of the greases prepared according to the method of the invention as compared to a similar grease prepared in a conventional manner.

TABLE I

| Method | Conventional coneutralization method | Present invention | |
| --- | --- | --- | --- |
| | | Example I | Example II |
| Worked penetration at 60 strokes, mm./10 at 77° F. | ---------- | 292 -------- | 308. |
| Dropping point, ° F. _____ | 500+ ------ | 500+ ------ | 500+. |
| Accelerated wheel bearing leakage test. | Pass _____ | Pass _____ | Pass. |
| Appearance and texture _____ | Gritty ____ | No grit ____ | No grit. |

As seen from the above table, the complex thickened grease prepared in a conventional manner was grainy and contained grit, while the greases prepared according to the manner of the invention were completely smooth and did not contain any grit.

*Example III*

A grain-free grease is prepared according to the method of Example I, except that a mixture consisting of 24.5 wt. percent caprylic acid, 57.8 wt. percent capric acid and 17.5 wt. percent lauric acid is used in place of the castor wax and Hydrofol Acid 51 of Example I.

What is claimed is:

1. In a process for the manufacture of a lubricating grease comprising lubricating oil and a grease thickening amount of a complex grease thickener comprising (1) an alkaline earth metal salt of a $C_1$ to $C_6$ fatty acid, (2) an alkaline earth metal salt of a higher molecular weight acid selected from the group consisting of salts of high molecular weight monocarboxylic acids and salts of intermediate molecular weight monocarboxylic acids, and combinations thereof, wherein said metal salts are formed in the presence of a lubricating oil and then are heated to a temperature conducive to the formation of a complex and are subsequently cooled; the improvement which comprises, initially forming a slurry comprising an alkaline earth metal base and at least a portion of the lubricating oil in a grease making zone, continuously withdrawing from said zone and circulating back to said zone a stream of said slurry, and slowly adding to said circulating slurry stream a stream of said $C_1$ to $C_6$ fatty acid, wherein the ratio of the rate of circulation of said slurry to the rate of addition of the $C_1$ to $C_6$ fatty acid is about 10:1 to about 100:1 by volume.

2. A process according to claim 1, wherein said ratio is about 25/1 to about 50/1 by volume.

3. A process according to claim 1, wherein said circulating slurry also contains high molecular weight monocarboxylic acid.

4. A process according to claim 1, wherein said circulating slurry contains intermediate molecular weight monocarboxylic acid.

5. A process according to claim 1, wherein said stream of low molecular weight acid is intimately mixed with said circulating slurry stream by means of an orifice mixer.

6. A process according to claim 1, wherein said metal base is selected from the group consisting of oxides, hydroxides and carbonates.

7. In a process for the manufacture of a lubricating grease comprising a mineral lubricating oil and a complex type grease thickener which in turn comprises the calcium salt of acetic acid and the calcium soap of a mixture of hydrogenated fish oil acids and hydrogenated castor oil wherein said complex grease thickener is formed in at least a portion of said mineral oil by the neutralization with lime of acetic acid, hydrogenated fish oil acids, and hydrogenated castor oil, followed by heating said mixture to a temperature conducive to the formation of a complex thickener to form a grease and subsequently cooling said grease, the improvement which comprises forming 1 part by volume of a slurry comprising (a) lime, (b) hydrogenated castor oil, (c) hydrogenated fish oil acid, and (d) lubricating oil, circulating through a circulating line said slurry at the rate of about .05 to .50 volume per minute, and slowly introducing a stream of acetic acid at the rate of about .001 to .05 volume per minute into said circulating slurry.

8. A method of manufacturing a lubricating oil composition comprising about 3 to 50 weight percent of a mixed-salt complex thickener comprising alkaline earth metal salt of a $C_1$ to $C_6$ fatty acid and alkaline earth metal salt of a higher fatty acid selected from the group consisting of $C_7$ to $C_{10}$ fatty acid and $C_{12}$ to $C_{30}$ fatty acid and mixtures thereof, which comprises, forming a slurry comprising lubricating oil and alkaline earth metal base in a grease making zone, withdrawing and circulating back to said zone a stream of said slurry, slowly adding said $C_1$ to $C_6$ fatty acid to said circulating slurry stream at a rate whereby the formation of grit is avoided and wherein the ratio of the rate of circulation of said slurry to the rate of addition of the $C_1$ to $C_6$ fatty acid is about 10:1 to 100:1 by volume, then adding the higher molecular weight acid to said grease making zone and heating to complex forming temperatures to form said composition.

9. A method according to claim 8, wherein said alkaline earth metal base is selected from the group consisting of oxides, hydroxides and carbonates.

10. A method according to claim 8, wherein said alkaline earth metal is calcium.

11. A method according to claim 8, wherein said $C_1$ to $C_6$ fatty acid is acetic acid and said alkaline earth metal base is calcium hydroxide.

References Cited in the file of this patent

UNITED STATES PATENTS

| | | |
|---|---|---|
| 2,417,428 | McLennan | Mar. 18, 1947 |
| 2,417,429 | McLennan | Mar. 18, 1947 |
| 2,417,430 | McLennan | Mar. 18, 1947 |
| 2,417,431 | McLennan | Mar. 18, 1947 |
| 2,417,432 | McLennan | Mar. 18, 1947 |
| 2,417,433 | McLennan | Mar. 18, 1947 |

OTHER REFERENCES

The Manufacture and Application of Lubricating Greases, Boner, Reinhold Pub. Corp. (N. Y.), 1954, pages 628 and 629.